(12) United States Patent
Swales et al.

(10) Patent No.: US 8,328,674 B2
(45) Date of Patent: Dec. 11, 2012

(54) HYBRID POWERTRAIN WITH SINGLE MOTOR/GENERATOR CONNECTED TO FINAL DRIVE ASSEMBLY AND METHOD OF ASSEMBLY

(75) Inventors: Shawn H. Swales, Canton, MI (US); Leonid Basin, Farmington Hills, MI (US); Fredrick R. Poskie, Plymouth, MI (US); James W. Haynes, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 385 days.

(21) Appl. No.: 12/692,820

(22) Filed: Jan. 25, 2010

(65) Prior Publication Data

US 2011/0179890 A1 Jul. 28, 2011

(51) Int. Cl.
*F16H 3/72* (2006.01)
*F16H 37/06* (2006.01)

(52) U.S. Cl. ............................................. 475/5; 475/151

(58) Field of Classification Search .............. 475/5, 151, 475/152
See application file for complete search history.

(56) References Cited

U.S. PATENT DOCUMENTS

| | | | |
|---|---|---|---|
| 7,582,034 B2* | 9/2009 | Usoro | 475/5 |
| 2003/0078134 A1* | 4/2003 | Kojima et al. | 477/3 |
| 2006/0128519 A1* | 6/2006 | Brooks et al. | 475/283 |
| 2007/0105679 A1* | 5/2007 | Tabata et al. | 475/5 |
| 2008/0076616 A1* | 3/2008 | Kidokoro et al. | 475/5 |

* cited by examiner

*Primary Examiner* — Edwin A Young
(74) *Attorney, Agent, or Firm* — Quinn Law Group, PLLC

(57) ABSTRACT

A hybrid powertrain for a vehicle is provided with a motor/generator for providing torque to a final drive input member. The powertrain includes an engine, a transmission having a transmission input member configured to receive power from the engine and a transmission output member. The powertrain further includes a final drive arrangement that has a final drive input member, and a motor/generator that has a motor shaft operatively connected to the final drive input member downstream of the transmission gearing arrangement. A drive system may operatively connect the transmission output member and the motor shaft to the final drive input member. A method of assembling a hybrid powertrain is also provided.

20 Claims, 5 Drawing Sheets

HYBRID POWERTRAIN WITH SINGLE MOTOR/GENERATOR CONNECTED TO FINAL DRIVE ASSEMBLY AND METHOD OF ASSEMBLY

TECHNICAL FIELD

The invention relates to a hybrid powertrain for a vehicle having a motor/generator connected to a final drive assembly and a method of assembling a hybrid powertrain.

BACKGROUND OF THE INVENTION

Hybrid transmissions offer fuel economy benefits by allowing an internal combustion engine to be turned off during some operating modes. Hybrid transmissions require packaging of a second power source, such as one or more motor/generators, that provide propulsion power. The additional components and packaging size requirements may increase the cost of hybrid transmissions, or limit their use to vehicle platforms having sufficient packaging space.

SUMMARY OF THE INVENTION

A hybrid powertrain for a vehicle is provided with a motor/generator that is easily assembled to a conventional automatic transmission. The motor/generator provides propulsion power to a final drive mechanism, and may be referred to as a "strong" hybrid. The powertrain enables existing conventional transmission platforms to be adapted to a hybrid platform, with minimal additional components and packaging space requirements. In some embodiments, the motor/generator is an off-axis motor/generator and should have lower spin losses than on-axis motor/generators (i.e., motor/generators with a rotor that rotates in line with other transmission components, such as the transmission input member, output member, or hub members).

The powertrain includes an engine, a transmission having a transmission input member configured to receive power from the engine, a transmission gearing arrangement connecting the transmission input member with a transmission output member, and a final drive arrangement having a final drive input member. A motor/generator and the transmission output member are both operatively connected to the final drive input member downstream of the transmission gearing arrangement. As used herein "downstream" means a position along a power flow path between a power source, such as the engine, and a powered member, such as the final drive input member. Driving power for propelling the vehicle may thereby be delivered to the final drive input member by the engine in at least one operating mode, by the motor/generator in at least another operating mode, and by both the engine and the motor/generator in still another operating mode.

In one embodiment, the transmission output member establishes a first axis of rotation, and the transmission input member and the engine share the same first axis of rotation. The final drive input member establishes a second axis of rotation, and the motor/generator establishes a third axis of rotation. A drive system connects the motor/generator and the transmission output member to the final drive input member. The drive system may be a chain drive that includes a first chain connecting the transmission output member to the final drive arrangement and a second chain that connects the motor shaft to the transmission output member. The chains may connect to an axially-split sprocket on the final drive input member. Alternatively, a single chain may be used to connect the components on the three axes of rotation. Still further, a gear drive may be used in lieu of a chain drive.

A method of assembling a hybrid transmission includes holding a carrier assembly and sun gear of a planetary gear set in place with a fixture. A sprocket is connected with the carrier assembly. A chain is then placed around the sprocket and around another sprocket mounted to a final drive assembly. A transmission casing with a ring gear member of the planetary gear set grounded thereto is installed onto the held carrier assembly. The fixture is then removed, as the planetary gear set is now held in position by the casing. The motor/generator is connected with the gear set by installing a shaft of the motor/generator into the sun gear member of the planetary gear set. The motor/generator is thereby operatively connected for providing torque to the final drive assembly.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
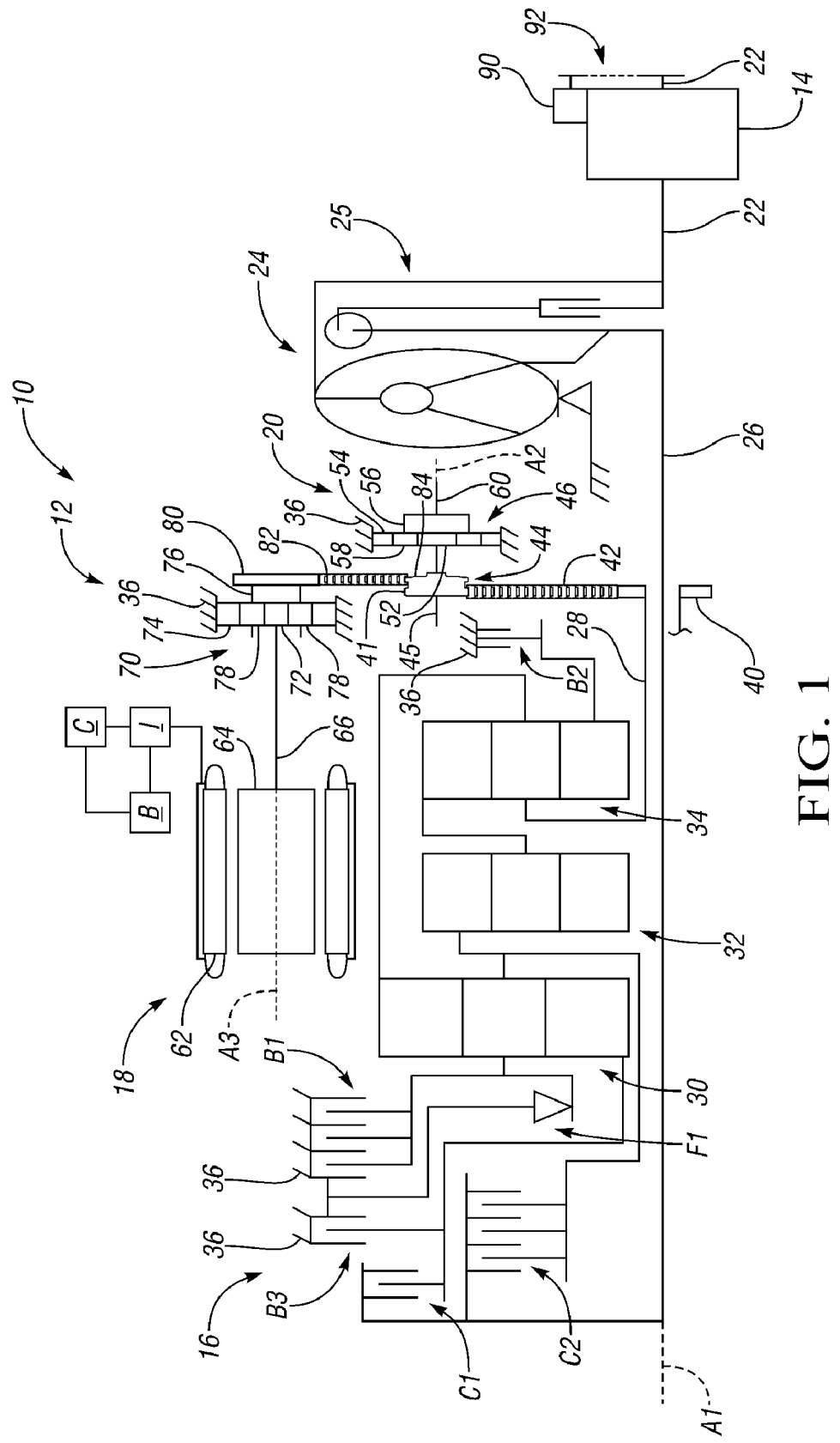
FIG. 1 is a schematic stick diagram illustration of a hybrid powertrain with an off-axis motor/generator.

Referring to the drawings, wherein like reference numbers refer to like components throughout the several views, FIG. 1 shows a vehicle 10 with a hybrid powertrain 12. The powertrain 12 includes an engine 14, a front wheel drive automatic transmission 16, and a single off-axis motor/generator 18, all of which are operatively connected to a final drive arrangement 20 for providing propulsion power to vehicle wheels as discussed further herein.

The engine 14 has an engine output member 22 connected through a torque converter 24 with bypass clutch and dampening mechanism 25 to a transmission input member 26. The transmission input member 26 is operatively connected to a coaxial transmission output member 28 through a transmission gearing arrangement that includes three planetary gear sets 30, 32, 34, three brakes B1, B2, and B3, two rotating-type clutches C1 and C2 and a one-way roller follower F1 that are engaged in different combinations to establish a reverse speed ratio and six forward speed ratios between the transmission input member 26 and the transmission output member 28. The brakes B1, B2 and B3 are selectively engagable to ground different members of the planetary gear sets 30, 32, 34 to the stationary transmission casing 36. The transmission input member 26 and transmission output member 28 are coaxially arranged to rotate about and establish a first axis of rotation A1.

A reverse speed ratio is established by engaging clutch C1 and brake B1. A first forward speed ratio is established by engaging brake B2. A second forward speed ratio is established by engaging brake B3 and brake B2. A third forward speed ratio is established by engaging clutch C1 and brake B2. A fourth forward speed ratio is established by engaging clutch C2 and brake B2. A fifth forward speed ratio is established by engaging clutch C1 and clutch C2. A sixth forward speed ratio is established by engaging brake B3 and clutch C2. The reverse speed ratio and the six forward speed ratios are fixed ratios between the transmission input member 26 and the transmission output member 28. The engagement of the brakes and clutches is accomplished by an electrohydraulic system including a transmission controller (not shown) that controls engagement according to vehicle operating conditions.

A first sprocket 40 is mounted for common rotation (i.e., rotates at the same speed with the transmission output member 28. A first chain 42 connects the sprocket 40 with a first portion 41 of an axially split, dual sprocket 44 mounted for common rotation with a final drive input member 45. The dual sprocket 44 is connected for rotation with a sun gear member 52 of planetary gear set 46 of the final drive arrangement 20. The planetary gear set 46 further includes a carrier 56 that the rotatably supports pinion gears 58. The pinion gears 58 mesh with the sun gear member 52 and the ring gear member 54. The ring gear member 54 is grounded to the transmission casing 36. The carrier member 56 is connected with the final drive output member 60 that provides torque to vehicle wheels through a final drive differential, not shown in FIG. 1, but as will be well understood by those skilled in the art. The final drive input member 45 and the final drive output member 60 establish a second axis of rotation A2.

The motor generator 18 includes a stator 62 surrounding a rotor 64, as is known. Electrical energy stored in a battery B is delivered through an inverter I to the stator 62 under the control of a controller C according to vehicle operating conditions. When electrical power is supplied to the stator 62, the rotor 64 and a motor shaft 66 connected thereto rotate. Conversely, the stator 62 can convert torque from the rotor 64 to electrical energy stored in the battery B when the motor/generator 18 is controlled to operate as a generator. The motor shaft 66 is connected to a sun gear member 72 of the planetary gear set 70. The sun gear member 72 is mounted concentric with the motor shaft 66. The rotor 64, the motor shaft 66 and planetary gear set 70 operatively connected thereto establish a third axis of rotation A3. The planetary gear set 70 further includes a carrier member 76 that rotatably supports pinion gears 78. The pinion gears 78 mesh with the sun gear member 72 as well as with a ring gear member 74 grounded to the transmission casing 36. A second sprocket 80 is connected for rotation with the carrier member 76. A second chain 82 connects the second sprocket 80 to a second portion 84 of the axially-split sprocket 44. The first chain 42, the second chain 82 and the sprockets 40, 80, 44 establish a chain drive. The chain drive allows torque to be transmitted between the transmission 16 and the final drive arrangement 20, and between the motor/generator 18 and the final drive arrangement 20. Thus, the chain drive allows the off-axis motor/generator 18 to deliver torque to the final drive arrangement 20.

Preferably, the planetary gear set 70 provides reduction gearing between the motor/generator 18 and the final drive input member 45, to provide sufficient torque to the final drive arrangement 20 with a smaller motor/generator. The positioning of the motor/generator 18 "off-axis" (i.e., on a separate axis than the transmission input member 26 and the transmission output member 28) allows a conventional automatic transmission 18 to be converted to a hybrid transmission without affecting the overall length of the powertrain 12.

In an alternative embodiment, the first and second chains 42, 82 would be replaced by a single chain that surrounds the first sprocket 40, the second sprocket 80, and a third sprocket mounted for rotation with the final drive input member 45 in place of the axially-split sprocket 44 to transfer torque between the transmission output member 28, the motor/generator 18 and the final drive arrangement 20. Additional chain guides may be used if necessary in such a single chain embodiment. A person of ordinary skill in the art would understand where to place such chain guides.

In other embodiments, the first and second chains 42, 82 may be replaced with another type of drive system, such as transfer gears, to transfer torque from one rotational axis to another. In still other embodiments, the motor/generator may be concentric with either the output member or the final drive input member (i.e., so that there are only two axes of rotation), in which case a drive assembly with a chain or transfer gears would only transfer torque between two axes of rotation. In yet another alternative embodiment, the output member, final drive input member and motor/generator could all rotate about a common axis, such as in a rear wheel-drive vehicle, in which case no chains or transfer gears would be necessary.

An optional starter motor 90 is shown operatively connected with the engine output member 22 (i.e., the crankshaft) through a belt alternator starter system 92. The starter motor may be a 12 Volt starter system that is operatively connected to the battery B or to a different battery. Many embodiments of such starter systems are known to those skilled in the art.

The hybrid powertrain 12 is operable in several different operating modes depending on vehicle operating conditions. One or more controllers, including controller C, controls engagement of the clutches C1, C2, and brakes B1, B2, B3 as well as operation of the engine 14 and motor/generator 18 to establish the various operating modes. The starter motor 90 may be used to start the engine 14 in a "cold start" (i.e., after the vehicle has been driven for a period of time), or in a start/stop situation (i.e., while the vehicle is being operated, either after stopping at a light or transitioning from an electric-only operating mode to a mode requiring operation of the engine 14. Alternatively, the motor/generator 18 can be controlled to start the engine 14 by providing torque through the transmission 16 to the engine output member 22 to crank the engine 14.

The hybrid powertrain train 12 is operable in any of the six fixed forward speed ratios and the reverse fixed speed ratio described above. Additionally, the motor/generator 18 may add torque to the final drive arrangement 20 through the planetary gear set 70 and chain drive to transition from any of the engine-only operating modes to establish a hybrid operating mode in which propulsion power is provided by both the engine 14 and the motor/generator 18. The motor/generator 18 may be controlled to operate as a generator to capture vehicle braking energy to be stored as electrical energy in the battery B. Furthermore, the hybrid powertrain 12 may be operated in an electric-only operating mode in which the engine 14 is stopped and propulsion power is provided by the motor/generator 18. This may be appropriate during high speed vehicle cruising. When vehicle acceleration is required or when battery B reaches a predetermined state of charge, the engine 14 can be restarted either by the motor/generator 18 or by optional starter motor 90, as discussed above.

Figure 2:
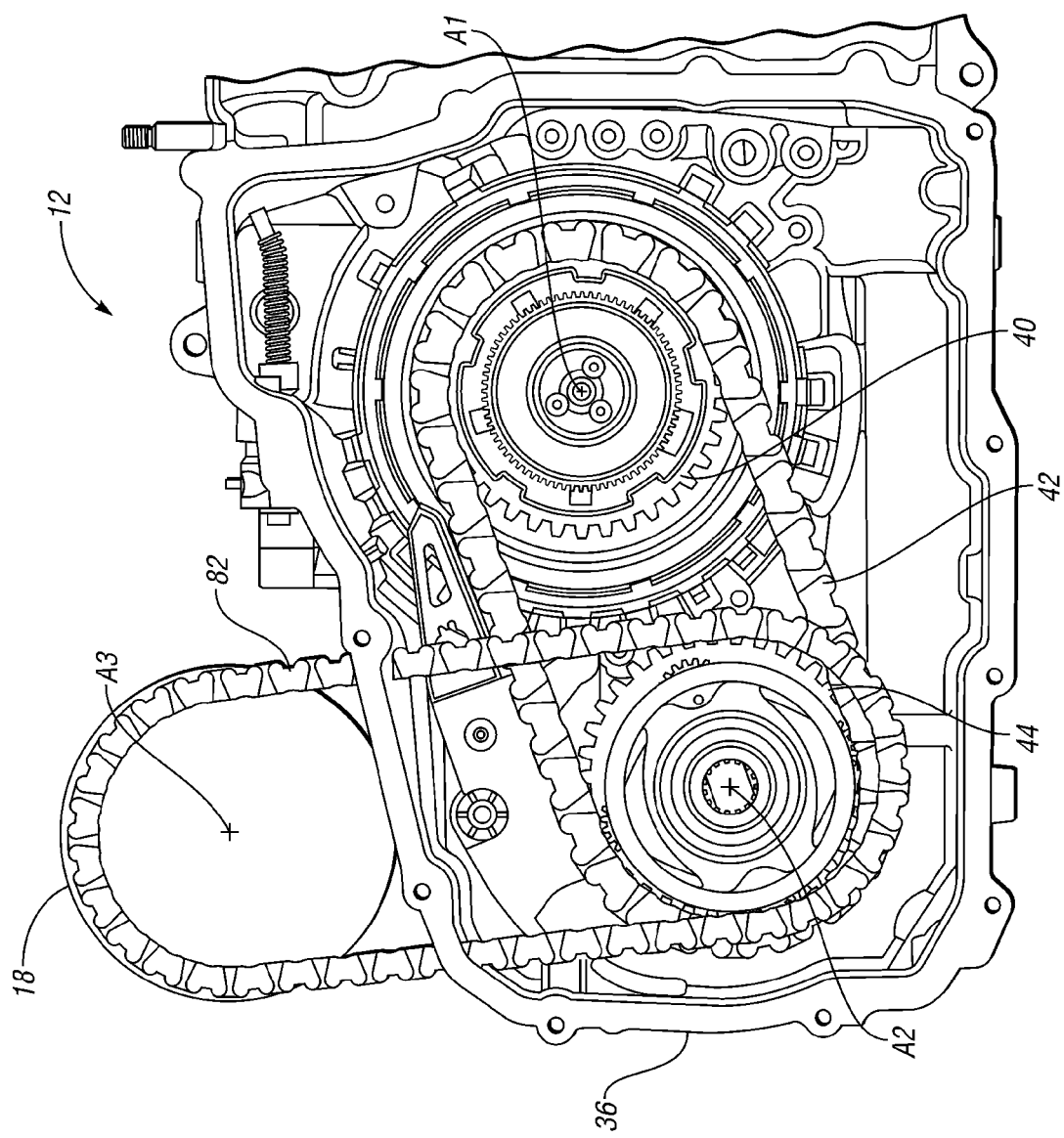
FIG. 2 is a schematic side view illustration of a hybrid powertrain of FIG. 1 with a portion of the transmission casing removed.

Referring to FIG. 2, the three axis arrangement of the hybrid powertrain 12 is shown. A portion of the transmission casing 36 as well as the motor shaft 66 and planetary gear set 70 and a portion of the final drive arrangement 20 is removed in FIG. 2. Seals are used where the second chain 82 passes through the transmission casing 36. The first sprocket 40 and a portion of the axially-split sprocket 44 is shown in FIG. 2.

Figure 3:
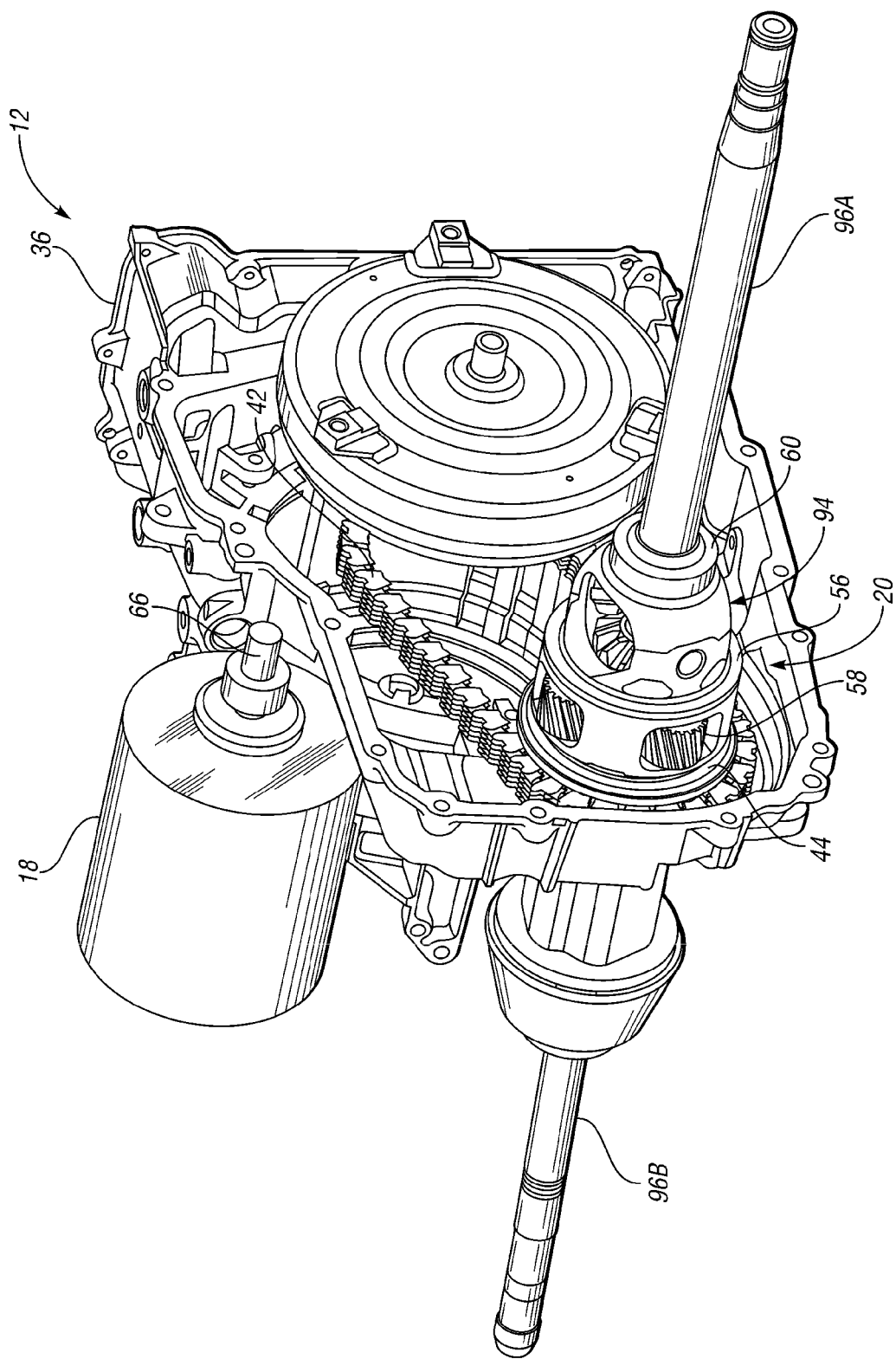
FIG. 3 is a schematic perspective illustration of the hybrid powertrain of FIGS. 1 and 2 with the transmission output member removed and with a chain connecting the motor/generator with a final drive input member removed.

FIG. 3 shows the final drive arrangement 20 including carrier member 56 and pinion gears 58. A differential mechanism 94 distributes torque from the final drive output member 60 connected for rotation with the carrier member 56 to front drive axles 96A, 96B. The planetary gear set 70, sprocket 80, and chain 82 as well as ring gear member 54, sprocket 40, and transmission output member 28 are removed in FIG. 3.

Figure 4:
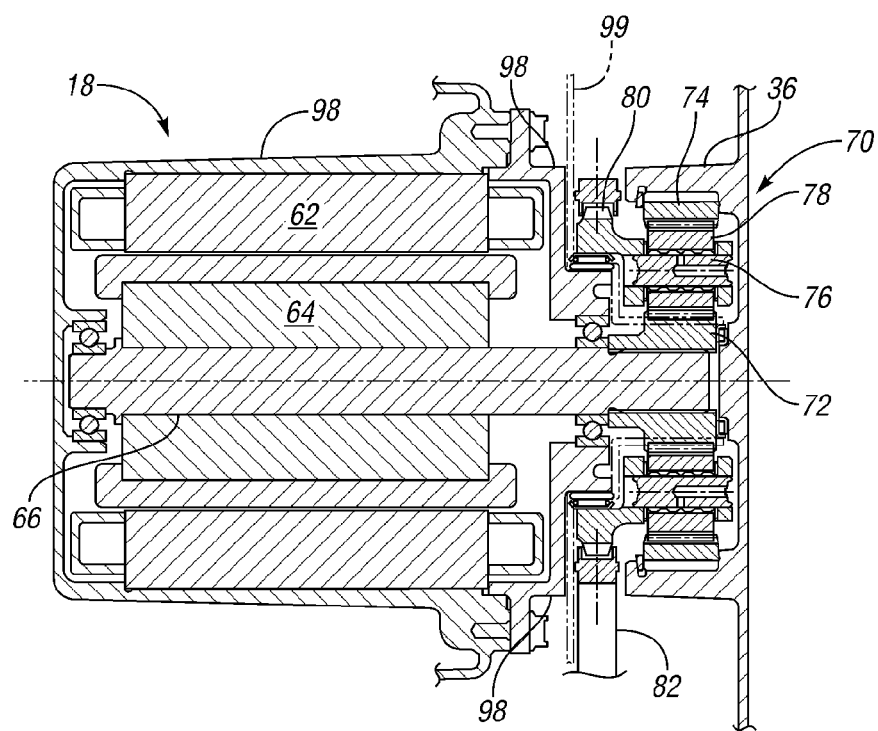
FIG. 4 is a schematic cross-sectional illustration of the motor/generator of FIGS. 1-3, showing in phantom a fixture used in assembling the powertrain.

FIG. 4 shows the motor generator 18 including a motor housing 98 surrounding the stator 62 and rotor 64. Planetary gear set 70 with the sprocket 80 connected to carrier 76 is shown along with second chain 82 connected to the sprocket 80. The motor shaft 66 is splined to the sun gear member 72. The ring gear member 74 is grounded to the transmission casing 36.

Figure 5:
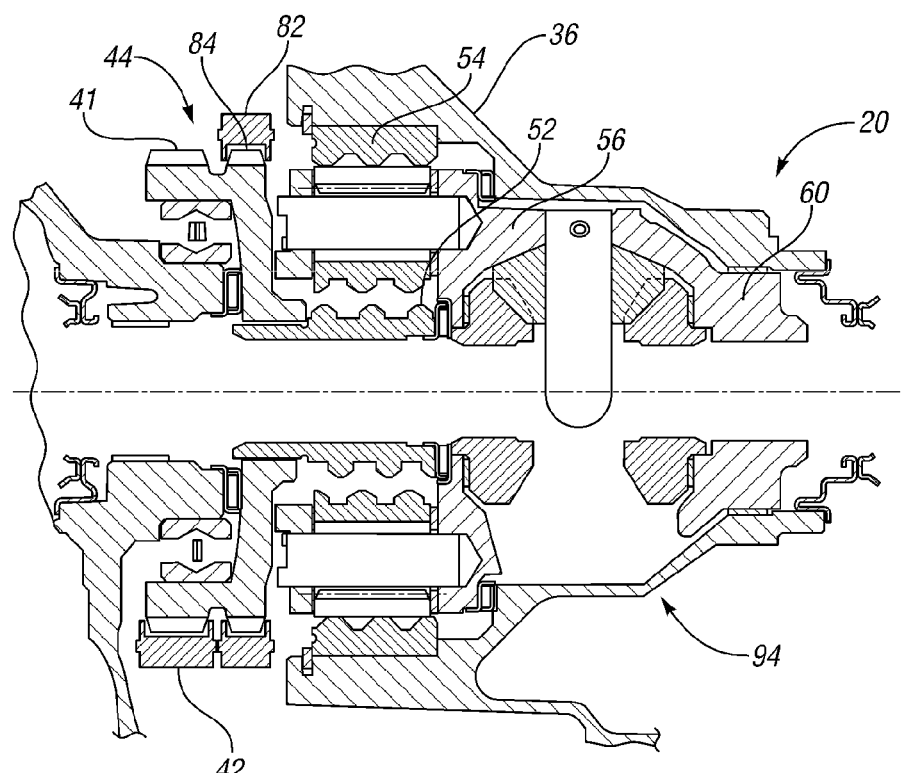
FIG. 5 is a schematic cross-sectional illustration in fragmentary view of the final drive input member with a planetary gear set and an axially-split sprocket.

Referring to FIG. 5, a portion of the final drive arrangement 20 is shown. The axially-split sprocket 44 is shown with the first sprocket portion 41 axially spaced from the second sprocket portion 84. The second chain 82 is shown on second sprocket portion 84 and first chain 42 is shown on first sprocket portion 41. Axially-split sprocket 44 is splined for rotation with sun gear member 52. Ring gear member 54 is grounded to the transmission housing 36. Carrier member 56 is connected for rotation with final drive output member 60. A differential mechanism 94 distributes torque from the final drive output member 60 to the vehicle wheels.

Figure 6:
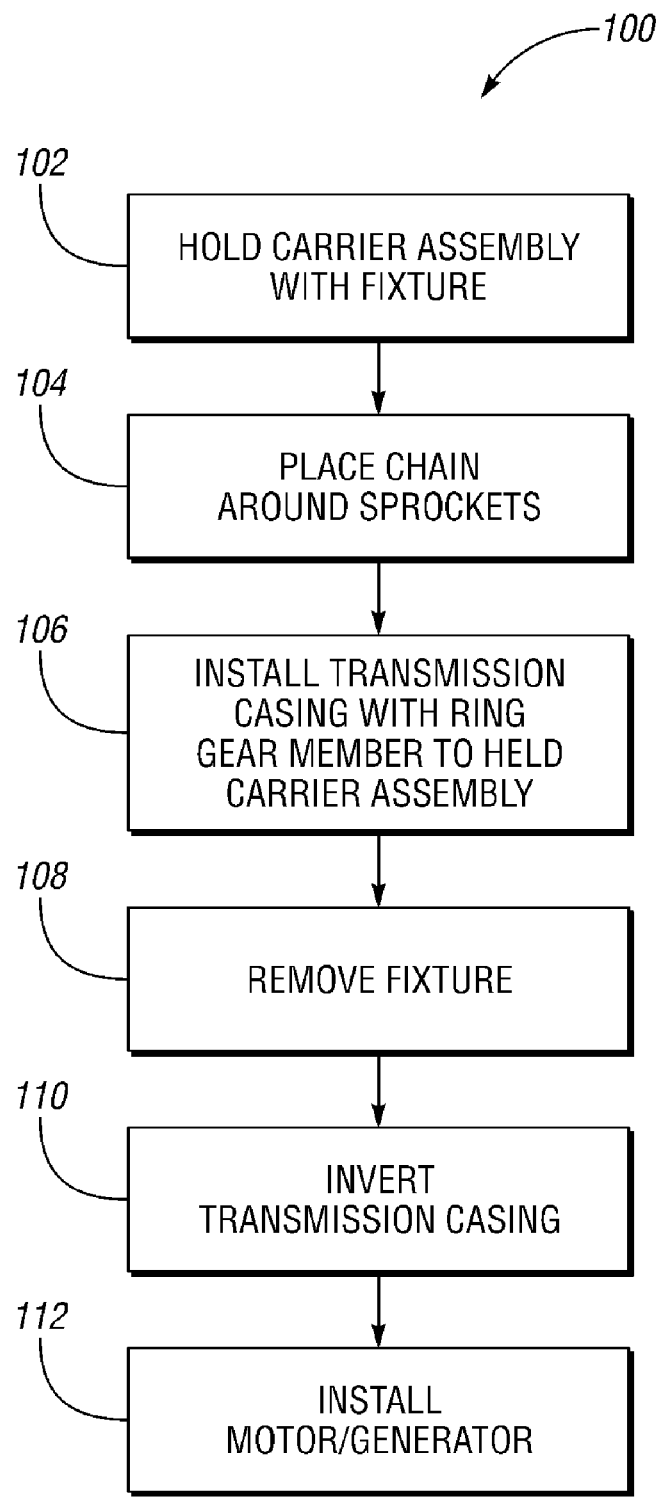
FIG. 6 is a flow diagram illustrating a method of assembling the transmission of FIGS. 1-5.

The off-axis positioning of the motor/generator 18 allows for relatively easy installation of the motor/generator 18, as well as removal of the motor/generator 18 for maintenance and/or repair. Specifically, FIG. 6 shows a flow chart of a method 100 of assembling a hybrid transmission, and specifically, a method of assembling the off-axis motor/generator 18 with chain drive to the remainder of the transmission 16. The method 100 begins with step 102 in which a fixture 99 shown in phantom in FIG. 4 is used to hold the carrier assembly of planetary gear set 70 in a desired axial and radial position. Specifically, fixture 99 holds the carrier member 76 with pinion gears 78 and sun gear member 72 along with the second sprocket 80 connected to the carrier member 76. The ring gear member 74 is not yet installed at step 102. In step 104, second chain 82 is placed around sprocket 80 as well as around axially-split sprocket 44 shown in FIGS. 1 and 5. In step 106, a portion of the transmission casing 36 with ring gear member 74 grounded thereto is installed on to the held carrier assembly, including carrier member 76. The portion of the transmission casing 36 may be referred to as a bell housing. Specifically, the ring gear member 74 is splined to the pinion gears 78. The transmission casing 36 would be moved in a direction to spline the ring gear member 74 to the pinion gears 78. In step 108, the fixture 99 is then removed by sliding axially away from the planetary gear set 70 (i.e. to the left in FIG. 4). The transmission casing 36 now holds the assembled planetary gear set 70 in position. The transmission casing 36 is then inverted in step 110 and the motor/generator 18 is installed in step 112 by aligning motor shaft 66 with sun gear member 72 and piloting the motor housing 98 onto the transmission casing 36. For repair and maintenance, the motor/generator 18 is easily removable by sliding the motor housing 98 away from planetary gear set 70. The planetary gear set 70 will remain in position, held by the transmission casing 36, until the motor/generator 18 can be reinstalled.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain for a vehicle comprising:
   an engine;
   a transmission having a transmission input member configured to receive power from the engine, a transmission output member, and a gearing arrangement operatively connecting the transmission input member with the transmission output member;
   a final drive arrangement having a final drive input member operatively connected to the transmission output member;
   a motor/generator operatively connected to the final drive input member downstream of the transmission gearing arrangement such that driving power for propelling the vehicle is deliverable to the final drive input member by the engine through the transmission gearing arrangement in at least one operating mode, by the motor/generator downstream of the transmission gearing arrangement in at least another operating mode, and by both the engine and the motor/generator in still another operating mode;
   wherein the transmission output member rotates about a first axis of rotation; wherein the final drive input member rotates about a second axis of rotation; wherein the motor/generator rotates about a third axis of rotation; and
   wherein the first axis of rotation, the second axis of rotation, and the third axis of rotation are offset from one another.

2. The hybrid powertrain of claim 1, further comprising:
   a drive system operatively connecting the transmission output member and the motor/generator with the final drive input member.

3. The hybrid powertrain of claim 2, wherein the drive system includes:
   a first chain;
   a second chain;
   a first sprocket connected for common rotation with the transmission output member; and
   a dual sprocket having a first portion and a second portion connected for rotation with the first portion; wherein the dual sprocket is operatively connected with the final drive arrangement and rotatable about the second axis of rotation;
   wherein the first chain operatively connects the first sprocket with the first portion of the dual sprocket; and
   wherein the second chain operatively connects the motor/generator shaft with the second portion of the dual sprocket.

4. The hybrid powertrain of claim 2, wherein the transmission has a transmission casing, and further comprising:
   a planetary gear set having a first member operatively connected for common rotation with the motor/generator, a second member operatively connected for driving the drive system, and a third member grounded to the transmission casing.

5. The hybrid transmission of claim 4, wherein the first member is a sun gear member, the second member is a carrier member, and the third member is a ring gear member.

6. The hybrid powertrain of claim 2, wherein the transmission has a transmission casing, and further comprising:

a planetary gear set having a first member driven by the drive system, a second member operatively connected for common rotation with the final drive output member, and a third member grounded to the transmission casing.

7. The hybrid powertrain of claim 6, wherein the first member is a sun gear member, the second member is a carrier member, and the third member is a ring gear member.

8. The hybrid powertrain of claim 1, further comprising:
a starter motor operatively connected to the engine for starting the engine.

9. The hybrid powertrain of claim 1, wherein the motor/generator is operable for starting the engine.

10. A hybrid powertrain comprising:
an engine;
an automatic transmission having:
 a transmission input member configured to receive power from the engine;
 a gearing arrangement;
 a transmission output member operatively connected to the transmission input member via the gearing arrangement;
wherein the transmission output member rotates about a first axis of rotation;
a final drive arrangement having a final drive input member; wherein the final drive input member rotates about a second axis of rotation;
a motor/generator having a motor shaft that rotates about a third axis of rotation;
a planetary gear set having a sun gear member, a carrier member and a ring gear member; wherein the sun gear member is connected for rotation with the motor shaft;
a chain drive including:
 a first sprocket mounted concentrically with the transmission output member and configured for rotation with the transmission output member;
 a second sprocket mounted concentrically with the motor shaft and connected for rotation with the carrier member;
 an axially-split sprocket mounted concentrically with the final drive input member and configured for rotation with the final drive input member; wherein the axially-split sprocket has a first sprocket portion and a second sprocket portion axially adjacent the first sprocket portion and configured for rotation therewith;
 a first chain operatively connecting the first sprocket with the first sprocket portion to transfer torque from the transmission output member to the final drive input member; and
 a second chain operatively connecting the second sprocket with the second sprocket portion to transfer torque from the motor/generator to the final drive input member such that driving power for propelling the vehicle is deliverable to the final drive input member by the engine in at least one operating mode, by the motor/generator in at least another operating mode, and by both the engine and the motor/generator in still another operating mode.

11. The hybrid powertrain of claim 10, wherein the motor/generator is operable to receive torque from the final drive input member via the chain drive in a regenerative braking mode.

12. The hybrid powertrain of claim 11, further comprising:
a starter motor operatively connected to the engine for starting the engine.

13. The hybrid powertrain of claim 11, wherein the motor/generator is operable for starting the engine by transferring torque through the automatic transmission to the engine via the first and second sprockets, the axially-split sprocket, the first chain and the second chain.

14. A hybrid powertrain for a vehicle comprising:
an engine;
a transmission having a transmission input member configured to receive power from the engine, a transmission output member, and a gearing arrangement operatively connecting the transmission input member with the transmission output member;
a final drive arrangement having a final drive input member operatively connected to the transmission output member;
a motor/generator operatively connected to the final drive input member downstream of the transmission gearing arrangement such that driving power for propelling the vehicle is deliverable to the final drive input member by the engine through the transmission gearing arrangement in at least one operating mode, by the motor/generator downstream of the transmission gearing arrangement in at least another operating mode, and by both the engine and the motor/generator in still another operating mode;
wherein the transmission output member rotates about a first axis of rotation; wherein the final drive input member rotates about a second axis of rotation; wherein the motor/generator rotates about a third axis of rotation;
a drive system operatively connecting the transmission output member and the motor/generator with the final drive input member;
wherein the drive system includes:
 a first chain;
 a second chain;
 a first sprocket connected for common rotation with the transmission output member; and
 a dual sprocket having a first portion and a second portion connected for rotation with the first portion; wherein the dual sprocket is operatively connected with the final drive arrangement and rotatable about the second axis of rotation;
wherein the first chain operatively connects the first sprocket with the first portion of the dual sprocket; and
wherein the second chain operatively connects the motor/generator shaft with the second portion of the dual sprocket.

15. The hybrid powertrain of claim 14, wherein the transmission has a transmission casing, and further comprising:
a planetary gear set having a first member operatively connected for common rotation with the motor/generator, a second member operatively connected for driving the drive system, and a third member grounded to the transmission casing.

16. The hybrid transmission of claim 15, wherein the first member is a sun gear member, the second member is a carrier member, and the third member is a ring gear member.

17. The hybrid powertrain of claim 14, wherein the transmission has a transmission casing, and further comprising:
a planetary gear set having a first member driven by the drive system, a second member operatively connected for common rotation with the final drive output member, and a third member grounded to the transmission casing.

18. The hybrid powertrain of claim 17, wherein the first member is a sun gear member, the second member is a carrier member, and the third member is a ring gear member.

19. The hybrid powertrain of claim 14, further comprising:
a starter motor operatively connected to the engine for starting the engine.

20. The hybrid powertrain of claim 14, wherein the motor/generator is operable for starting the engine.

* * * * *